US012214992B2

(12) United States Patent
Fumiya et al.

(10) Patent No.: US 12,214,992 B2
(45) Date of Patent: Feb. 4, 2025

(54) CONTROL APPARATUS FOR ELEVATOR

(71) Applicant: Mitsubishi Electric Corporation, Tokyo (JP)

(72) Inventors: Akira Fumiya, Tokyo (JP); Takahide Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1350 days.

(21) Appl. No.: 16/651,362

(22) PCT Filed: Nov. 30, 2017

(86) PCT No.: PCT/JP2017/043150

§ 371 (c)(1), (2) Date: Mar. 27, 2020

(87) PCT Pub. No.: WO2019/106801

PCT Pub. Date: Jun. 6, 2019

(65) Prior Publication Data

US 2020/0270095 A1 Aug. 27, 2020

(51) Int. Cl.

*B66B 1/24* (2006.01)
*B66B 1/28* (2006.01)
*B66B 1/34* (2006.01)

(52) U.S. Cl.

CPC ............ *B66B 1/2416* (2013.01); *B66B 1/285* (2013.01); *B66B 1/3461* (2013.01); (Continued)

(58) Field of Classification Search

CPC ..... B66B 1/2416; B66B 1/285; B66B 1/3461; B66B 2201/222; B66B 2201/405; B66B 2201/4653; B66B 1/468

See application file for complete search history.

(56) References Cited

U.S. PATENT DOCUMENTS

| | | | |
|---|---|---|---|
| 2009/0132197 | A1 | 5/2009 | Rubin et al. |
| 2016/0221791 | A1 | 8/2016 | Berryhill |

FOREIGN PATENT DOCUMENTS

| | | | |
|---|---|---|---|
| CN | 104709782 | A | 6/2015 |
| CN | 107207183 | A | 9/2017 |

(Continued)

OTHER PUBLICATIONS

International Search Report and Written Opinion mailed on Jan. 16, 2018 for PCT/JP2017/043150 filed on Nov. 30, 2017, 11 pages including English Translation of the International Search Report.

(Continued)

*Primary Examiner* — Jeffrey Donels
(74) *Attorney, Agent, or Firm* — XSENSUS LLP

(57) ABSTRACT

Provided is a control apparatus for an elevator that can control the operation of the elevator in a suitable manner when a user is not a pedestrian, without requiring the user for a complicated operation. A control apparatus (7) according to the present invention is provided with: a call registration unit (14) that registers a call for an elevator (1) based on information transmitted by wireless communication from a mobile terminal (10) to communication equipment (8) installed in a region passable by a user (9); and an operation control unit (15) that, when a user type is determined to be a wheeled moving body from a detection result of an acceleration sensor (12) of the mobile terminal (10), controls the operation of the elevator (1) in a manner different from a case where the user type is determined to be a pedestrian.

8 Claims, 6 Drawing Sheets

(52) U.S. Cl.
CPC ... *B66B 2201/222* (2013.01); *B66B 2201/405* (2013.01); *B66B 2201/4653* (2013.01)

(56) References Cited

FOREIGN PATENT DOCUMENTS

| | | | | |
|---|---|---|---|---|
| JP | 52-102670 | A | | 8/1977 |
| JP | 52-102670 | U | | 8/1977 |
| JP | 2000-86095 | A | | 3/2000 |
| JP | 2000-211833 | A | | 8/2000 |
| JP | 2004-10303 | A | | 1/2004 |
| JP | 2004-275497 | A | | 10/2004 |
| JP | 2005096982 | A | * | 4/2005 |
| JP | 2006-131403 | A | | 5/2006 |
| JP | 2010-184796 | A | | 8/2010 |
| JP | 2011-504331 | A | | 2/2011 |
| JP | 2011-057156 | A | | 3/2011 |
| JP | 2011-067156 | A | | 3/2011 |
| JP | 2011051710 | A | * | 3/2011 |
| JP | 2013-241230 | A | | 12/2013 |
| JP | 2014169150 | A | * | 9/2014 |
| JP | 2015-003785 | A | | 1/2015 |
| JP | 2015-113205 | A | | 6/2015 |
| JP | 2015-212885 | A | | 11/2015 |
| JP | 2016-064892 | A | | 4/2016 |
| JP | 2016212456 | A | * | 12/2016 |
| KR | 20170113255 | A | * | 10/2017 |

OTHER PUBLICATIONS

Notification of Reasons for Refusal received for Japanese Patent Application No. 2018-522163, mailed on May 29, 2018, 12 pages including English Translation.
Notification of Reasons for Refusal received for Japanese Patent Application No. 2018-522163, mailed on Aug. 21, 2018, 12 pages including English Translation.
Chinese Office Action dated May 7, 2022 in the corresponding Chinese patent application No. 201780097222.1.
Office Action issued on Nov. 11, 2021, in corresponding Chinese patent Application No. 201780097222.1, 18 pages.

* cited by examiner

CONTROL APPARATUS FOR ELEVATOR

CROSS-REFERENCE TO RELATED APPLICATIONS

The present application is based on PCT filing PCT/JP2017/043150, filed Nov. 30, 2017, the entire contents of which are incorporated herein by reference.

TECHNICAL FIELD

The present invention relates to a control apparatus for an elevator.

BACKGROUND ART

It has been known that, for example, when a user is using a wheelchair, operation of an elevator is controlled in a manner different from usual. Patent Literature 1 below describes a technique for controlling operation of an elevator based on information transmitted from a mobile terminal owned by a user.

CITATION LIST

Patent Literature

[PTL 1] JP 2015-003785 A

SUMMARY OF INVENTION

Technical Problem

In the technique described in Patent Literature 1, in order to transmit information indicating that the user is using a wheelchair to a control apparatus for the elevator, it is necessary to operate the mobile terminal to make a setting in advance. Hence, the user using the wheelchair is required for a complicated operation.

The present invention has been made to solve the above problem. The purpose thereof is to provide a control apparatus for an elevator that can control the operation of the elevator in a suitable manner when a user is not a pedestrian, without requiring the user for a complicated operation.

Solution to Problem

A control apparatus for an elevator according to the present invention is provided with: a call registration unit that registers a call for the elevator based on information transmitted by wireless communication from a mobile terminal to communication equipment installed in a region passable by a user; and an operation control unit that, when a user type is determined to be a wheeled moving body from a detection result of an acceleration sensor of the mobile terminal, controls the operation of the elevator in a manner different from a case where the user type is determined to be a pedestrian.

Advantageous Effects of Invention

According to the present invention, when the user type is determined to be a wheeled moving body from a detection result of the acceleration sensor of the mobile terminal, the operation of the elevator is controlled in a manner different from a case where the user type is determined to be a pedestrian. Hence, it is possible to control the operation of the elevator in a suitable manner when the user is not a pedestrian, without requiring the user for a complicated operation.

DESCRIPTION OF EMBODIMENT

The following describes an embodiment with reference to the accompanying drawings. In each figure, the same reference sign is attached to the same or corresponding portion. A repeated description will be simplified or omitted as appropriate.

Embodiment 1

Figure 1:
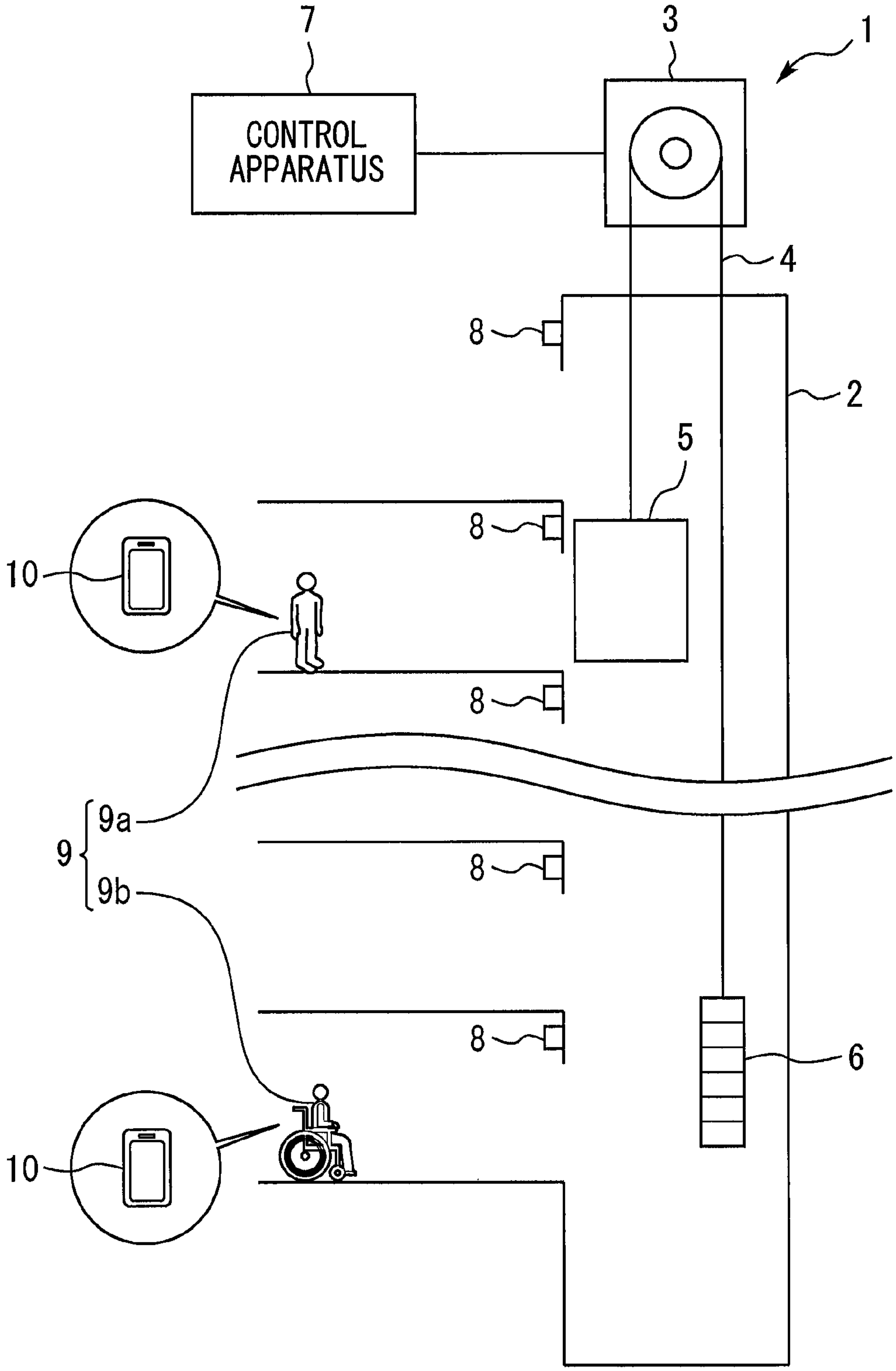
FIG. 1 is a schematic diagram illustrating an overview of a control system of an elevator in Embodiment 1.

FIG. 1 is a schematic diagram illustrating an overview of a control system of an elevator in Embodiment 1.

As illustrated in FIG. 1, an elevator 1 includes a hoist-way 2, a traction machine 3, a rope 4, a car 5, a counter weight 6, and a control apparatus 7. The hoist-way 2 is, for example, formed so as to penetrate each floor of a building. The traction machine 3 is provided, for example, in a machine room or the like (not illustrated). The control apparatus 7 is provided, for example, in the hoist-way 2, the machine room, or the like. The rope 4 is wound around the traction machine 3. The car 5 and the counter weight 6 are suspended by the rope 4 in the hoist-way 2. The car 5 and the counter weight 6 are raised and lowered by drive of the traction machine 3. The traction machine 3 is controlled by the control apparatus 7.

The control apparatus 7 may, for example, be a device for controlling the movement of one car 5. The control apparatus 7 may, for example, be a group management device for controlling movement of a plurality of cars 5.

As illustrated in FIG. 1, in the building, communication equipment 8 having a wireless communication function is provided. The communication equipment 8 is provided, for example, in each of the floors where the car 5 is available. A plurality of pieces of communication equipment 8 may, for example, be provided in one floor. The communication equipment 8 is, for example, electrically connected with the control apparatus 7.

The communication equipment 8 is installed, for example, in a region passable by a user 9 in the building. The communication equipment 8 may be installed, for example, in a hall of the elevator 1. The communication equipment 8 may be installed, for example, at a position near the hall of the elevator 1 in a passage in the building. The communication equipment 8 may be installed, for example, at a position away from the hall of the elevator 1 in the passage in the building.

FIG. 1 illustrates a user 9*a* and a user 9*b* as the user 9. The user 9*a* is a pedestrian. The user 9*b* is using a wheeled moving body. The wheeled moving body includes, for example, a manual wheelchair, an electric traveling vehicle, and the like. The electric traveling vehicle includes, for example, an electric wheelchair, a personal mobility, and the like.

The user 9 is carrying a mobile terminal 10 with a wireless communication function. The mobile terminal 10 is, for example, a mobile phone, a smartphone, a tablet terminal, or the like. The mobile terminal 10 may, for example, be an elevator call registration terminal formed as a hands-free tag.

Figure 2:
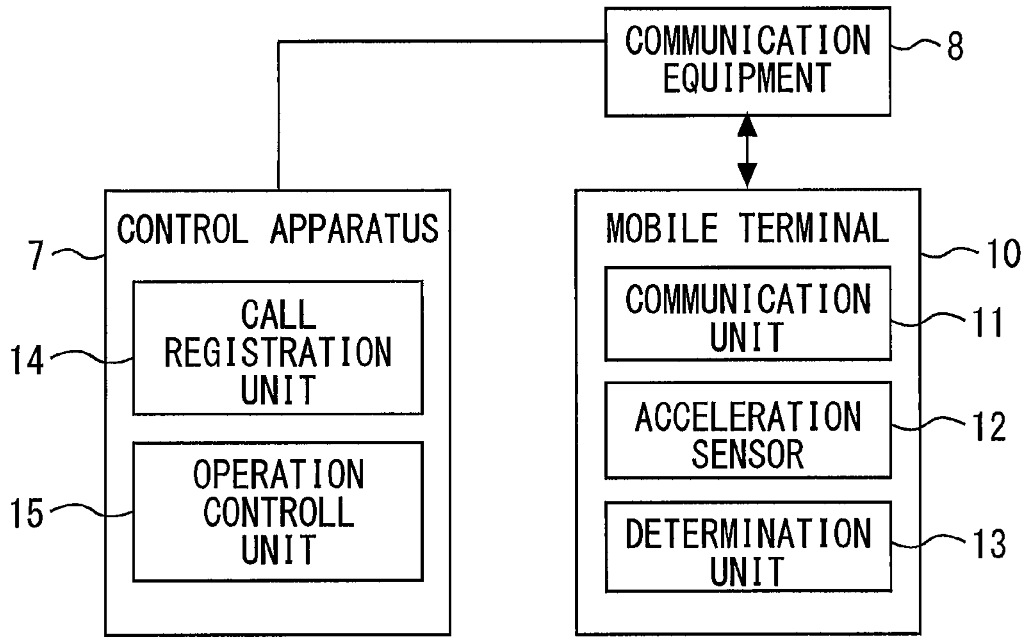
FIG. 2 is a configuration diagram of a control system of the elevator in Embodiment 1.

FIG. 2 is a configuration diagram of a control system of the elevator in Embodiment 1.

As illustrated in FIG. 2, the control system is provided with the control apparatus 7, the communication equipment 8, and the mobile terminal 10. The mobile terminal 10 includes a communication unit 11, an acceleration sensor 12, and a determination unit 13. The control apparatus 7 includes a call registration unit 14 and an operation control unit 15.

When the mobile terminal 10 is located within the communication range of the communication equipment 8, the communication unit 11 performs wireless communication with the communication equipment 8. For example, even when the operation of the mobile terminal 10 is not performed by the user, the communication unit 11 can automatically transmit a call registration signal to the communication equipment 8.

The acceleration sensor 12, for example, detects acceleration in each of three axial directions orthogonal to one another. For example, when the mobile terminal 10 enters the communication range of the communication equipment 8, the acceleration sensor 12 starts operation to detect the acceleration.

Figure 3:
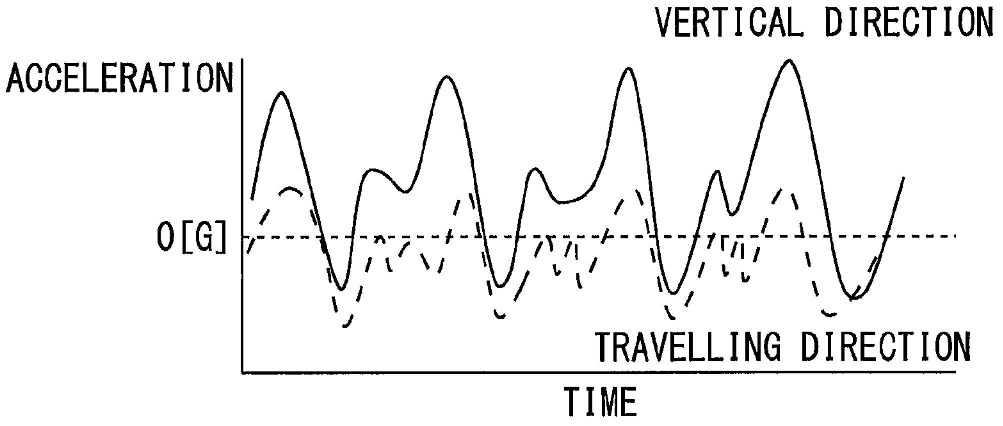
FIG. 3 is a diagram illustrating an example of a change in acceleration of a pedestrian.
Figure 4:
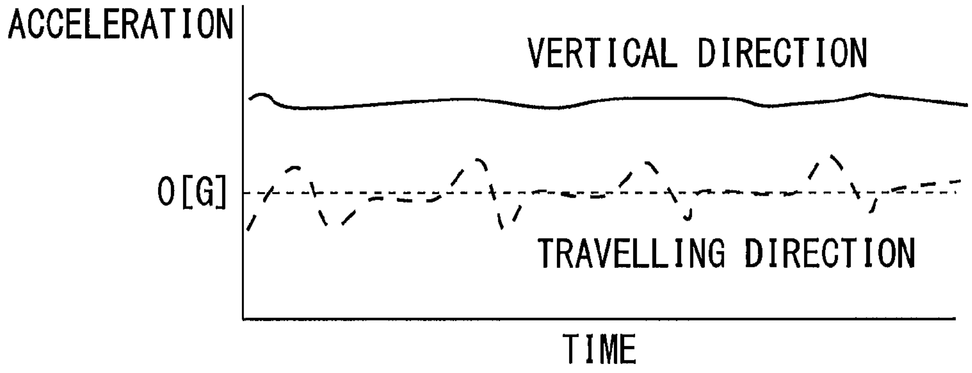
FIG. 4 is a diagram illustrating an example of a change in acceleration of a solo manual wheelchair.
Figure 5:
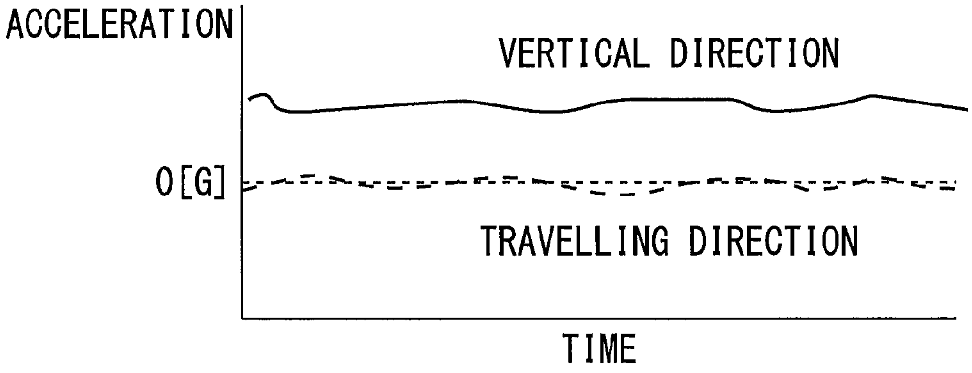
FIG. 5 is a diagram illustrating an example of a change in acceleration of an electric traveling vehicle.

FIG. 3 is a diagram illustrating an example of a change in acceleration of a pedestrian. FIG. 4 is a diagram illustrating an example of a change in acceleration of a solo manual wheelchair. FIG. 5 is a diagram illustrating an example of a change in acceleration of an electric traveling vehicle.

Each of waveforms in FIGS. 3 to 5 illustrates a temporal change in acceleration of a user moving on a flat floor surface. The unit of the acceleration is G. In each of the figures, the acceleration change in the vertical direction is represented by a solid line. In each of the figures, the acceleration change in the travelling direction of the user is represented by a dashed line. An acceleration component in the vertical direction and an acceleration component in the travelling direction are calculated from a detection result of the acceleration sensor 12.

As illustrated in FIG. 3, the acceleration in the vertical direction of the pedestrian and the acceleration in the travelling direction of the pedestrian vary periodically with movement of both feet.

As illustrated in FIG. 4, the acceleration in the vertical direction of the manual wheelchair is almost constant. As illustrated in FIG. 4, the acceleration in the travelling direction of the manual wheelchair varies periodically with hand-pushing movement.

As illustrated in FIG. 5, the acceleration in the vertical direction of the electric traveling vehicle and the acceleration in the travelling direction of the electric traveling vehicle are almost constant.

The determination unit 13 determines the user type based on the detection result of the acceleration sensor 12. For example, when the mobile terminal 10 enters the communication range of the communication equipment 8, the determination unit 13 starts the determination operation.

The determination unit 13 determines whether the user type is a pedestrian, a manual wheelchair, or an electric traveling vehicle, for example, based on characteristics of acceleration waveforms as illustrated in FIGS. 3 to 5.

The user type to be determined by the determination unit 13 may include, for example, a "manual wheelchair with a helper." That the user type is a manual wheelchair with a helper may be determined, for example, based on the detection result of the acceleration sensor 12 and the radio wave receiving state in the mobile terminal 10 of each of the user and the helper of the manual wheelchair.

The radio wave receiving state includes, for example, radio field intensity. The radio wave receiving state includes, for example, a distinction as to whether or not radio waves are being received.

The determination as to whether or not the user type is a manual wheelchair with a helper can be carried out when, for example, the respective mobile terminals 10 of the user and the helper of the manual wheelchair are communicable to each other. This determination may, for example, be carried out by the determination unit 13 of one of the mobile terminals 10, having received information indicating the detection result of the acceleration sensor 12 and the radio wave receiving state from the other of the mobile terminals 10. This determination is, for example, based on that the detected radio field intensities roughly match with each other in the two mobile terminals 10. Further, this determination is, for example, based on that the timings at which the radio wave receiving state shifts between non-reception and reception roughly match with each other in the two mobile terminals 10.

For example, when the user type is determined by the determination unit 13, the communication unit 11 adds the information indicating the user type to the call registration signal. Note that the communication unit 11 may add other information to the call registration signal.

The communication unit 11 transmits, for example, the call registration signal added with the information indicating the user type to the communication equipment 8 by wireless communication. Note that the communication unit 11 may transmit other information separately from the call registration signal.

The call registration unit 14 registers a call for the elevator 1, for example, based on the call registration signal received by the communication equipment 8. The call registration unit 14 may register a call for the elevator 1, for example, based on an operation performed on a hall button or a button in the car (not illustrated).

The operation control unit 15 controls the operation of the elevator 1. The operation of the elevator 1 includes, for example, the movement of the car 5 and the opening and closing of the door. The operation control unit 15 controls the operation of the elevator 1, for example, in a manner corresponding to the user type indicated by the information added to the call registration signal received by the communication equipment 8.

For example, when the user type is a pedestrian, the operation control unit 15 carries out normal operation of the elevator 1.

For example, when the user type is a wheeled moving body, the operation control unit 15 controls the operation of the elevator 1 in a manner different from the normal operation.

For example, when the user type is a solo manual wheelchair, the operation control unit 15 carries out operation for a wheelchair.

During the operation for a wheelchair, for example, the door opening and closing speed becomes lower than during the normal operation. During the operation for a wheelchair, for example, the door opening time is made longer than during the normal operation.

For example, when the user type is an electric traveling vehicle, the operation control unit 15 carries out the operation for a wheelchair and performs additional control. As the additional control, the operation control unit 15 may, for example, draw attention of the other users by a vocal announcement or the like. As the additional control, the operation control unit 15 may, for example, limit the number of other users who can ride the same car 5 as the electric traveling vehicle. Note that the other users are all the other users who use the elevator, including users on floors except for the floor where the car 5 is stopping.

For example, when the number of other users is small, the operation control unit 15 may carry out dedicated operation for the electric traveling vehicle, thereby not permitting the ride of the other users in the car 5. For example, a vocal announcement, a display to the inside of the car or to the hall, or the like is used not to permit the ride. In this case, the other users cannot ride the same car 5 as the electric traveling vehicle. A determination criterion on whether or not the number of other users is small is, for example, set in advance.

For example, when the number of other users is small, the operation control unit 15 may limit the number of passengers in the car 5 by not responding to a hall call made on a floor different from the floor where the electric traveling vehicle gets in the car. In this case, until the electric traveling vehicle gets out at its destination floor, the car 5 passes the floor where the hall call has been made. A determination criterion on whether or not the number of other users is small is, for example, set in advance.

For example, when the user type is a manual wheelchair with a helper and when the number of other users is large, the operation control unit 15 may carry out the normal operation of the elevator 1. The determination criterion on whether or not the number of other users is large is, for example, set in advance.

For example, when the user type is a manual wheelchair with a helper, the operation control unit 15 may limit the number of other users who can ride the same car 5. A method for limiting the number of passengers in the car 5 is, for example, similar to the case where the user type is an electric traveling vehicle.

In Embodiment 1, the determination unit 13 may be a function of the control apparatus 7. In this case, when information indicating the detection result of the acceleration sensor 12, the radio wave receiving state of the mobile terminal 10, and the like is transmitted from the communication unit 11 to the communication equipment 8, the determination unit 13 can carry out the determination operation. In this case, for example, at a point in time when the mobile terminal 10 enters the communication range of the communication equipment 8, the communication unit 11 may transmit the call registration signal in advance, and until the mobile terminal 10 exits the communication range, the communication unit 11 may continuously transmit data on the acceleration and the radio waves. In this case, there is no need for the mobile terminals 10 to communicate with each other to determine whether or not the user type is a manual wheelchair with a helper. For example, the determination of the user type may be performed in the individual mobile terminals 10, and based on timings for reception of the call registration signals by the control apparatus 7 from the respective mobile terminals 10 of the helper and the user riding on the manual wheelchair, the control apparatus 7 may determine that the user type is a manual wheelchair with a helper.

As described above, the determination unit 13 determines whether or not the user type is an electric traveling vehicle. However, due to little change in acceleration of the electric traveling vehicle in motion, the acceleration waveform thereof can be similar to the acceleration waveform of the user who is stationary. For example, in the determination operation, the determination unit 13 discriminates whether the user is stationary or the user type is an electric traveling vehicle. The following describes a method for discriminating the stationary user and the electric traveling vehicle.

For example, based on the magnitude of the variation in acceleration, the determination unit 13 can discriminate the stationary user and the electric traveling vehicle. This discrimination method is based on that the stationary user varies less in acceleration than the electric traveling vehicle.

For example, based on the speed change in the travelling direction of the user, the determination unit 13 can discriminate the stationary user and the electric traveling vehicle. This discrimination method is based on that the speed in the travelling direction of the electric traveling vehicle can change with the traveling. The speed in the travelling direction of the user is obtained by integrating the component in the travelling direction of the acceleration.

For example, based on the detection result of the acceleration sensor 12 and the radio wave receiving state of the mobile terminal 10, the determination unit 13 can discriminate the stationary user and the electric traveling vehicle. The following describes this discrimination method with reference to FIGS. 6 and 7.

Figure 6:
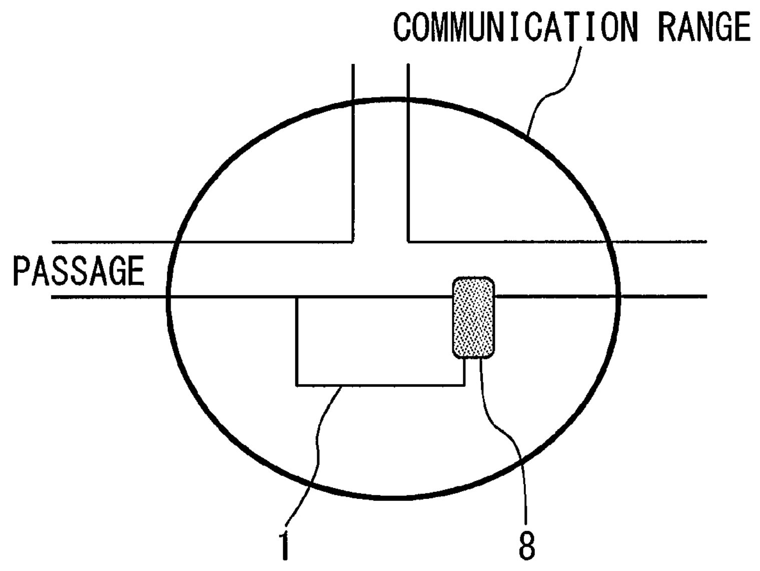
FIG. 6 is a first schematic diagram illustrating an example of the placement of the communication equipment in Embodiment 1.

FIG. 6 is a first schematic diagram illustrating an example of the placement of the communication equipment in Embodiment 1.

FIG. 6 illustrates a case where the communication equipment 8 is installed at a position in the hall of the elevator 1 or near the hall. In this case, the communication range of the communication equipment 8 includes the hall and a passage near the hall. In this case, when the user moves toward the hall of the elevator 1, the radio field intensity between the mobile terminal 10 and the communication equipment 8 becomes stronger. On the other hand, when the user is stationary, the radio field intensity between the mobile terminal 10 and the communication equipment 8 remains unchanged.

In a case where the communication equipment 8 is disposed as in FIG. 6, for example, when there is a change in radio field intensity and the change in acceleration is small, the determination unit 13 can determined that the user type is an electric traveling vehicle. The determination criterion on whether or not the change in acceleration is small is, for example, set in advance.

Figure 7:
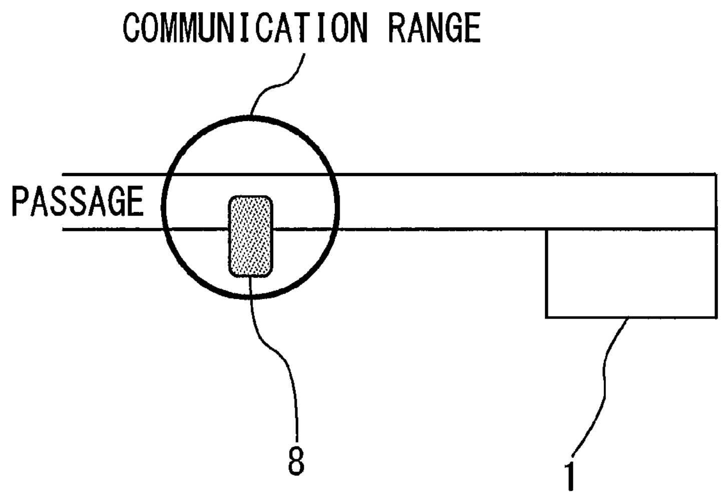
FIG. 7 is a second schematic diagram illustrating an example of placement of the communication equipment in Embodiment 1.

FIG. 7 is a second schematic diagram illustrating an example of placement of the communication equipment in Embodiment 1.

FIG. 7 illustrates a case where the communication equipment 8 is installed in a passage toward the hall of the elevator 1. The communication range of the communication equipment 8 in FIG. 7 is narrower than the communication range of the communication equipment 8 in FIG. 6. In this case, the communication range of the communication equipment 8 does not include the hall or the passage near the hall. In this case, when the user moves toward the hall of the elevator 1, the mobile terminal 10 receives radio waves only when the user passes through the communication range. On the other hand, when the user is stationary, the radio wave receiving state of the mobile terminal 10 remains unchanged.

In a case where the communication equipment 8 is disposed as in FIG. 7, for example, when the radio wave receiving state of the mobile terminal 10 shifts in the order of non-reception, reception, and non-reception and the change in acceleration is small, the determination unit 13 can determine that the user type is an electric traveling vehicle. The determination criterion on whether or not the change in acceleration is small is, for example, set in advance.

Figure 8:
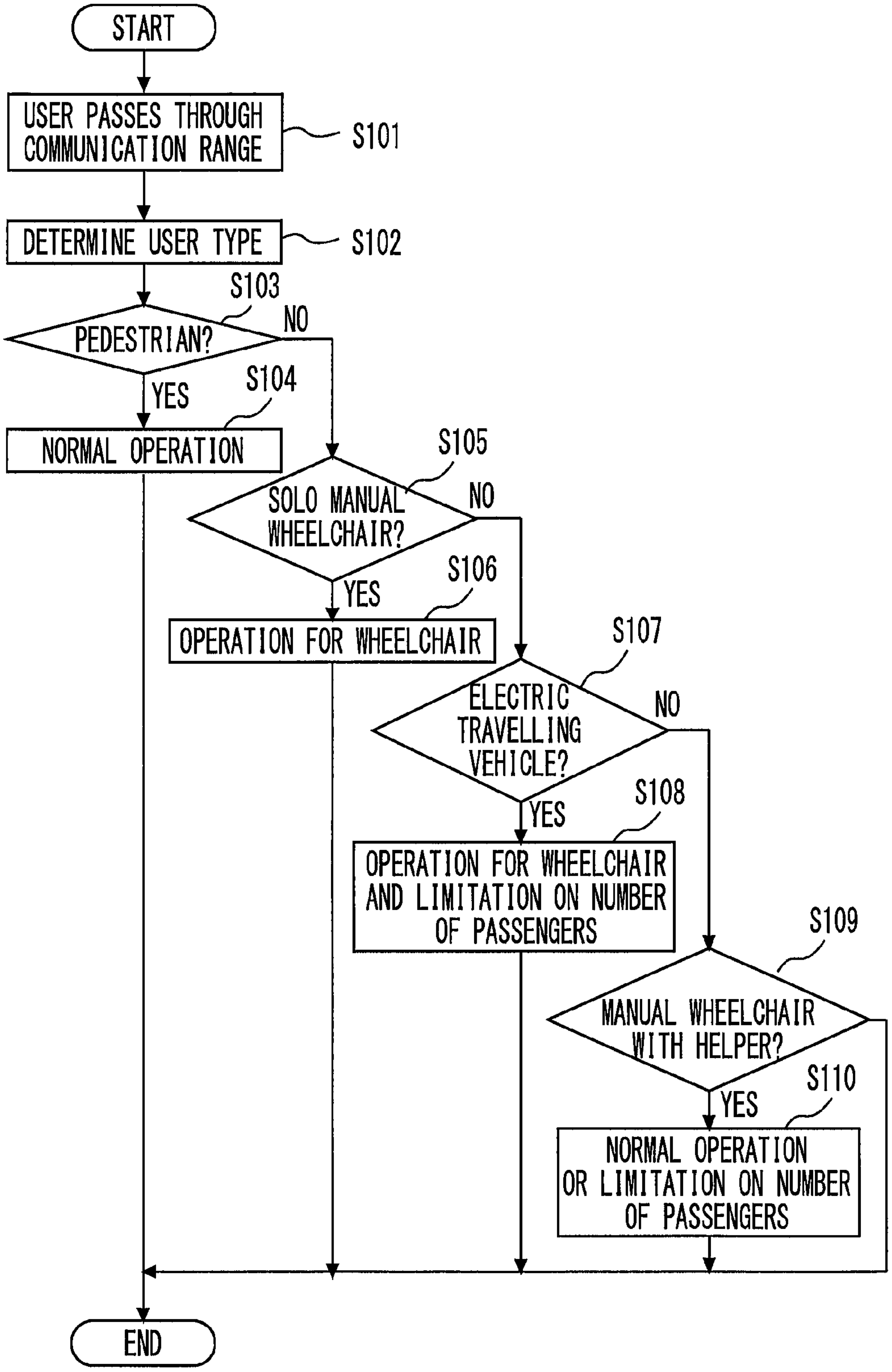
FIG. 8 is a flowchart illustrating an example of operation of a control system for the elevator in Embodiment 1.

FIG. 8 is a flowchart illustrating an example of operation of a control system for the elevator in Embodiment 1.

When the user passes through the communication range (step S101), the user type is determined (step S102).

In step S103, whether or not the user type is a pedestrian is determined.

When the user type is determined to be a pedestrian in step S103, the normal operation is carried out (step S104).

When the user type is determined not to be a pedestrian in step S103, the processing of step S105 is performed. In step S105, whether or not the user type is a solo manual wheelchair is determined.

When the user type is determined to be a solo manual wheelchair in step S105, the operation for a wheelchair is carried out (step S106).

When the user type is determined not to be a solo manual wheelchair in step S105, the processing of step S107 is performed. In step S107, whether or not the user type is an electric traveling vehicle is determined.

When the user type is determined to be an electric traveling vehicle in step S107, the operation for a wheelchair and the limitation on the number of passengers are carried out (step S108).

When the user type is determined not to be an electric traveling vehicle in step S107, the processing of step S109 is performed. In step S109, whether or not the user type is a manual wheelchair with a helper is determined.

When the user type is determined to be a manual wheelchair with a helper in step S109, the normal operation or the limitation on the number of passengers is carried out (step S110).

That the user type has been determined not to be a manual wheelchair with a helper in step S109 means that the user type has been unable to be determined. For example, when the user is stationary within the communication range, in step S109, the user type can be determined not to be a manual wheelchair with a helper. In this case, for example, the normal operation may be carried out or the call registration may not be performed.

According to Embodiment 1, the call registration unit 14 registers a call for the elevator 1 based on the information transmitted by wireless communication from the mobile terminal 10 to the communication equipment 8 installed in the region passable by the user. When the user type is determined to be a wheeled moving body from the detection result of the acceleration sensor 12 of the mobile terminal 10, the operation control unit 15 controls the operation of the elevator 1 in a manner different from a case where the user type is determined to be a pedestrian. Hence, it is possible to control the operation of the elevator 1 in a suitable manner when a user is not a pedestrian, without requiring the user for a complicated operation.

According to Embodiment 1, when the user type is determined to be an electric traveling vehicle from the detection result of the acceleration sensor 12 of the mobile terminal 10, the operation control unit 15 controls the operation of the elevator 1 in a manner different from a case where the user type is determined to be a manual wheelchair. For example, when the user type is determined to be an electric traveling vehicle, the operation control unit 15 carries out the operation for a wheelchair and limits the number of other users who can ride the same car 5 as the user. Hence, it is possible to improve the convenience of the user of the electric traveling vehicle. For example, because the electric wheelchair is generally larger than the manual wheelchair, it is significant to limit the number of other users who can ride the same car 5.

According to Embodiment 1, when the user type is determined to be a manual wheelchair with a helper from the detection result of the acceleration sensor 12 of the mobile terminal 10, the operation control unit 15 controls the operation of the elevator 1 in a manner different from a case where the user type is determined to be a solo manual wheelchair. For example, when the user type is a manual wheelchair with a helper, the operation control unit 15 carries out the normal operation. It is thus possible to prevent reduction in the convenience of other users. The manual wheelchair with a helper can avoid interference with other users more easily than a solo manual wheelchair, thus having little safety problem even when riding with other users.

According to Embodiment 1, when it is determined that the user is not stationary but the user type is an electric traveling vehicle from the detection result of the acceleration sensor 12 of the mobile terminal 10 and the radio wave receiving state of the mobile terminal 10, the operation control unit 15 controls the operation of the elevator 1 in a manner corresponding to the electric traveling vehicle. Hence, it is possible to prevent the type of a simply stationary user from being erroneously determined as an electric traveling vehicle.

In Embodiment 1, the determination unit 13 may, for example, detect that the wheeled moving body has crossed between the hall and the car from the detection result of the acceleration sensor 12 of the mobile terminal 10. This detection is performed, for example, based on a change in acceleration in the vertical direction that is detected when the wheels pass the gap between the floor surface of the car 5 and the floor surface of the hall. For example, when the user type is determined to be a wheeled moving body, the operation control unit 15 may not get the movement of the car 5 started until the determination unit 13 detects that the wheeled moving body has crossed between the hall and the car 5 from the detection result of the acceleration sensor 12 of the mobile terminal 10. It is thus possible to improve the convenience of the user of the wheeled moving body.

In Embodiment 1, the determination unit 13 may, for example, detect that the wheeled moving body has made pre-set specific movement from the detection result of the acceleration sensor 12 of the mobile terminal 10. For example, when it is detected that the wheeled moving body has made pre-set specific movement, the call registration unit 14 may register a call corresponding to the movement. Specifically, for example, it may be set such that an upward call is registered when the wheeled moving body has moved to rotate clockwise. It is thus possible to improve the convenience of the user of the wheeled moving body.

In Embodiment 1, the control system may include an estimation unit that performs estimation operation. The estimation operation is to estimate a required time for the user to arrive at the hall of the elevator 1 or a time at which the user arrives at the hall, based on the moving speed of the user calculated from the detection result of the acceleration sensor 12 of the mobile terminal 10. The operation control unit 15 may, for example, adjust a timing for the car 5 to arrive at the hall in accordance with the required time or the time estimated by the estimation unit. This makes it possible to prevent the car 5 from arriving excessively early or late.

The estimation unit may, for example, be a function of the control apparatus 7. In this case, when the information indicating the detection result of the acceleration sensor 12 or the speed in the travelling direction of the user has been added to the call registration signal by the communication unit 11, the estimation unit can carry out the estimation operation.

The estimation unit may, for example, be a function of the mobile terminal 10. In this case, when the information indicating the required time or the time estimated by the estimation unit has been added to the call registration signal by the communication unit 11, the operation control unit 15 can adjust the timing for the car 5 to arrive at the hall.

Figure 9:
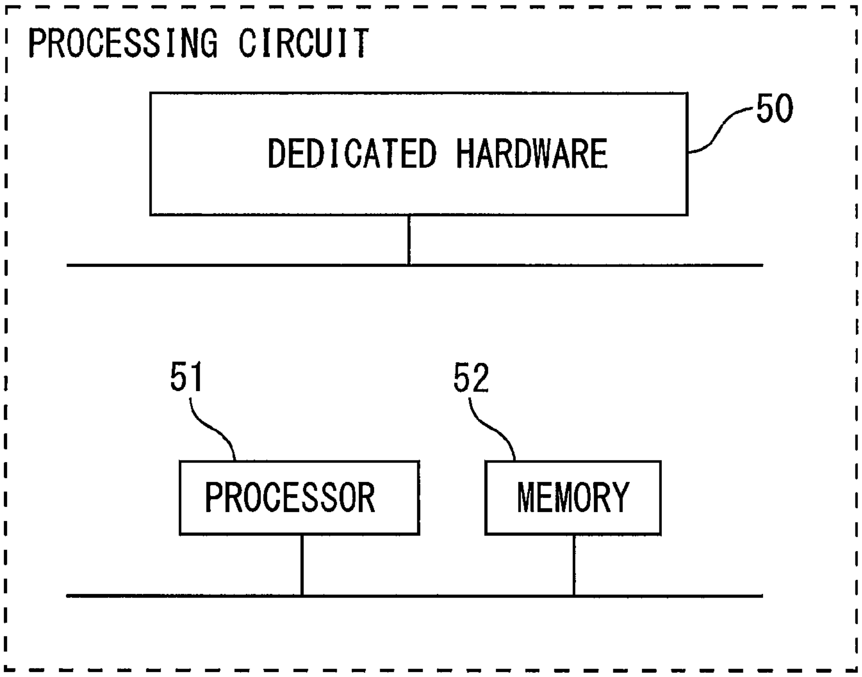
FIG. 9 is a hardware configuration diagram of the control apparatus.

FIG. 9 is a hardware configuration diagram of the control apparatus.

Each function of the call registration unit 14 and the operation control unit 15 in the control apparatus 7 is realized by a processing circuit. The processing circuit may be dedicated hardware 50. The processing circuit may include a processor 51 and a memory 52. A part of the processing circuit may be formed as the dedicated hardware 50, and the processing circuit may further include the processor 51 and the memory 52. FIG. 9 illustrates an example of a case where a part of the processing circuit has been formed as the dedicated hardware 50 and the processing circuit includes the processor 51 and the memory 52.

When at least a part of the processing circuit is at least one dedicated hardware 50, the processing circuit corresponds to, for example, a single circuit, a composite circuit, a programmed processor, a parallel programmed processor, an application specific integrated circuit (ASIC), a field-programmable gate array (FPGA), or a combination of these.

When the processing circuit includes at least one processor 51 and at least one memory 52, each function of the control apparatus 7 is realized by software, firmware, or a combination of the software and the firmware. The software and the firmware are described as programs and stored into the memory 52. The processor 51 reads and executes the program stored in the memory 52 to realize the function of each unit. The processor 51 is also called a central processing unit (CPU), a central processor, a processing unit, a computing unit, a microprocessor, a microcomputer, and a digital signal processor (DSP). The memory 52 corresponds to, for example, non-volatile or volatile semiconductor memories such as a random-access memory (RAM), a read-only memory (ROM), a flash memory, an erasable programmable read-only memory (EPROM), and an electrically erasable programmable read-only memory (EEPROM), a magnetic disk, a flexible disk, an optical disc, a compact disc, a mini-disc, a digital versatile disc (DVD), and the like.

As thus described, the processing circuit can realize each function of the control apparatus 7 by hardware, software, firmware, or a combination of these. Note that each function of the mobile terminal 10 is also realized by a processing circuit similar to the processing circuit illustrated in FIG. 9.

INDUSTRIAL APPLICABILITY

As described above, the present invention can be used in a system that controls the operation of the elevator based on information transmitted from the mobile terminal.

REFERENCE SIGNS LIST

1 Elevator
2 Hoist-way
3 Traction machine
4 Rope
5 Car
6 Counter weight
7 Control apparatus
8 Communication equipment
9 User
9*a* User
9*b* User
10 Mobile terminal
11 Communication unit
12 Acceleration sensor
13 Determination unit
14 Call registration unit
15 Operation control unit
50 Dedicated hardware
51 Processor
52 Memory.

The invention claimed is:

1. A control apparatus for an elevator, comprising:

processing circuitry configured to register a call for the elevator based on information automatically transmitted by wireless communication from a mobile terminal to communication equipment installed in a region passable by a user; and the processing circuitry is further configured to control, when a user type is an electric travelling vehicle from which both acceleration in vertical direction and acceleration in travelling direction detected by an acceleration sensor of the mobile terminal vary non-periodically, operation of the elevator in a manner different from a case where the user type is a pedestrian from which both the acceleration in the vertical direction and the acceleration in the travelling direction detected by the acceleration sensor of the mobile terminal vary periodically.

2. The control apparatus for the elevator according to claim 1, wherein, when the user type is determined to be-the electric traveling vehicle from the detection result of the acceleration sensor of the mobile terminal, the processing circuitry carries out operation for a wheelchair and limits the number of other users being able to ride a car on which the user rides.

3. The control apparatus for the elevator according to claim 1, wherein, when the user type is a manual wheelchair from which the acceleration in the vertical direction detected by the acceleration sensor of the mobile terminal vary non-periodically and the acceleration in the travelling direction detected by the acceleration sensor of the mobile terminal vary periodically, and the user type is a manual wheelchair with a helper from the detection result of the acceleration sensor of the mobile terminal and a radio wave receiving state of the mobile terminal, the processing circuitry controls the operation of the elevator in a manner different from a case where the user type is a solo manual wheelchair.

4. The control apparatus for the elevator according to claim 1, wherein, when the user type is a manual wheelchair from which the acceleration in the vertical direction detected by the acceleration sensor of the mobile terminal vary non-periodically and the acceleration in the travelling direction detected by the acceleration sensor of the mobile terminal vary periodically, and the user type is a manual wheelchair with a helper from the detection result of the acceleration sensor of the mobile terminal and a radio wave receiving state of the mobile terminal, the processing circuitry carries out normal operation.

5. The control apparatus for the elevator according to claim 1, wherein, when the user is not stationary and the user type is the electric traveling vehicle from a detection result of the acceleration sensor of the mobile terminal and a radio wave receiving state of the mobile terminal, the processing circuitry controls the operation of the elevator in a manner corresponding to the electric traveling vehicle.

6. The control apparatus for the elevator according to claim 1, wherein, when the user type is a wheeled moving body, the processing circuitry does not get movement of a car started until crossing of the wheeled moving body between a hall and the car is detected from a change in acceleration detected by the acceleration sensor of the mobile terminal when wheels of the wheeled moving body pass a gap between a floor surface of the car and a floor surface of the hall.

7. The control apparatus for the elevator according to claim 1, wherein, when the user type is a wheeled moving body, and pre-set specific movement of the wheeled moving body is detected from a detection result of the acceleration sensor of the mobile terminal, the processing circuitry registers a call corresponding to the movement.

8. The control apparatus for the elevator according to claim 1, wherein the processing circuitry adjusts a timing for a car to arrive at a hall in accordance with a required time for the user to arrive at the hall of the elevator, the required time being estimated based on a moving speed of the user calculated from a detection result of the acceleration sensor of the mobile terminal.

* * * * *